United States Patent
McCray et al.

(10) Patent No.: US 9,208,344 B2
(45) Date of Patent: Dec. 8, 2015

(54) DATABASE ACCESS USING A COMMON WEB INTERFACE

(75) Inventors: Mark McCray, Clayton, NC (US); Eric Scott Davis, Morrisville, NC (US)

(73) Assignee: LexisNexis, A Division of Reed Elsevier Inc., Miamisburg, OH (US)

( * ) Notice: Subject to any disclaimer, the term of this patent is extended or adjusted under 35 U.S.C. 154(b) by 74 days.

(21) Appl. No.: 13/228,895

(22) Filed: Sep. 9, 2011

(65) Prior Publication Data

US 2013/0067548 A1   Mar. 14, 2013

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/62 | (2013.01) |

(52) U.S. Cl.
CPC .......... *G06F 21/6227* (2013.01); *H04L 63/083* (2013.01)

(58) Field of Classification Search
CPC ...................................................... G06F 21/41
See application file for complete search history.

(56) References Cited

U.S. PATENT DOCUMENTS

| | | | |
|---|---|---|---|
| 7,334,013 B1 * | 2/2008 | Calinov et al. ................ | 709/201 |
| 7,730,113 B1 * | 6/2010 | Payette et al. ................ | 707/821 |
| 7,814,226 B2 | 10/2010 | Patrick | |
| 7,949,711 B2 | 5/2011 | Chang et al. | |
| 8,326,868 B2 * | 12/2012 | Kocsis et al. ................ | 707/771 |
| 2003/0158949 A1 * | 8/2003 | Miller et al. ................ | 709/229 |
| 2008/0069124 A1 | 3/2008 | Patrick | |
| 2009/0112981 A1 * | 4/2009 | Markovich .................... | 709/203 |
| 2009/0249453 A1 | 10/2009 | Cluck et al. | |
| 2009/0313364 A1 | 12/2009 | Parsons et al. | |
| 2010/0211781 A1 | 8/2010 | Auradkar et al. | |
| 2010/0268764 A1 | 10/2010 | Wee et al. | |
| 2010/0319004 A1 | 12/2010 | Hudson et al. | |
| 2012/0072898 A1 * | 3/2012 | Pappas et al. ................ | 717/171 |
| 2012/0233684 A1 * | 9/2012 | Denis et al. ....................... | 726/9 |

OTHER PUBLICATIONS

"LexisNexis, Time Matters Deliver World Edition Practice Management Software with Remote, Secure Access to Data", PR Newswire, Aug. 2, 2001; http://www.thefreelibrary.com/LexisNexis,+Time+Matters+Deliver+World+Edition+Practice+Management . . . -a076923799.*

(Continued)

*Primary Examiner* — Peter Poltorak
*Assistant Examiner* — Quy Pham
(74) *Attorney, Agent, or Firm* — Dinsmore & Shohl LLP (57) ABSTRACT

Methods and systems for accessing databases using a common web interface are provided. A method for transmitting data retrieved from an endpoint device to a client device using a common web interface includes providing the common web interface to the client device. The common web interface allows access to a plurality of endpoint devices, each endpoint device comprising a unique endpoint address. The method further includes receiving, by a computer, identification data from the client device, retrieving an endpoint address for one of the plurality of endpoint devices based on the identification data, connecting to the endpoint device corresponding to the endpoint address, retrieving data from the endpoint device, and transmitting the retrieved data to the client device.

14 Claims, 5 Drawing Sheets

(56) References Cited

OTHER PUBLICATIONS

Tejaswi Redkar, "AppFabric Service Bus," Windows Azure Platform, Apress, Jan. 1, 2009, 427-504, Print; http://link.springer.com/chapter/10.1007%2F978-1-4302-2480-8_8?LI=true#.*

Thoughts on Information Technology; Miguel Santos Ribeiro; http://itechthoughts.wordpress.com/2009/04/12/windows-azure-service-bus-publishsubscribe-example/.

Azure: Running Multiple Web Sites in a Single WebRole; http://blog.bareweb.eu/2011/01/azure-running-multiple-web-sites-in-a-single-webrole/.

AppFabric Service Bus—Things You Should Know—Part 1 of 3 (Naming Your Endpoints); http://windowsazurecat.com/2011/05/appfabric-service-bus-things-you-should-know-part-1-of-3-naming-your-endpoints/.

Basic Client and Service Working with the .NET; http://7388.info/index.php/article/studio/2011-03-22/11927.html.

Building Distributed Applications With .NET Services Aaron Skonnard; http://msdn.microsoft.com/en-us/magazine/dd569759.aspx.

Clemens Vasters; Cloud Development and Alien Abductions; http://vasters.com/clemensv/PermaLink,guid,92d78bee-2cfd-4a29-95ab-c5abb9b905e7.aspx.

Introduction to Azure AppFabric; http://alexanderkoval.wordpress.com/2011/02/12/introduction-to-azure-appfabric/.

Wednesday, Feb. 16, 2011 Windows Azure and Cloud Computing Posts for Feb. 15, 2011; http://oakleafblog.blogspot.com/2011/02/windows-azure-and-cloud-computing-posts_16.html.

http://aicache.com/helpdesk/knowledgebase.php?act=art&article_id=112.

Web portal From Wikipedia, the free encyclopedia; http://en.wikipedia.org/wiki/Web_portal#Hosted_web_portals.

Windows Azure Guest OS 1.3 (Release 201004-01); http://msdn.microsoft.com/en-us/library/ff729421.aspx.

* cited by examiner

DATABASE ACCESS USING A COMMON WEB INTERFACE

BACKGROUND

1. Field

The present specification generally relates to methods of accessing databases and, more particularly, methods and systems for accessing databases using a common web interface.

2. Technical Background

A user of a mobile computing device, such as a cell phone or smart phone may desire to retrieve data from a database located in a location remote from the mobile computing device or record data to a database located in a location remote from the mobile computing device. The user may utilize a web browser executing on the mobile computing device to access the database from which data will be retrieved or data will be recorded. In order to access the database, the web browser executing on the mobile device may interface with a website that is capable of accessing the database.

It may be desirable for a website to provide access to databases located within separate computer networks so that multiple mobile computing device users may access the databases located in the network that the mobile computing device is authorized to access. One approach for a website to provide access to databases located within separate computer networks is to replicate each database from each computer network that the website is capable of accessing and to co-locate the replicated databases within the computer network of the website. This approach may be undesirable in that it requires maintaining replicated databases that may contain sensitive data. In addition, this approach may be undesirable because it may be difficult to synchronize the replicated databases to ensure that they contain current data.

Accordingly, a need exists for alternative methods and systems for accessing databases.

SUMMARY

In one embodiment, a method for transmitting data retrieved from an endpoint device to a client device using a common web interface includes providing the common web interface to the client device. The common web interface allows access to a plurality of endpoint devices, each endpoint device including a unique endpoint address. The method further includes receiving, by a computer, identification data from the client device, retrieving an endpoint address for one of the plurality of endpoint devices based on the identification data, connecting to the endpoint device corresponding to the endpoint address such that the common web interface and the endpoint device may communicate data, retrieving data from the endpoint device, and transmitting the retrieved data to the client device.

In another embodiment, a method for transmitting law firm data retrieved from a law firm database to a client device using a common web interface includes providing the common web interface to the client device. The common web interface allows access to a plurality of law firm servers, each law firm server including a unique law firm server endpoint address and a plurality of law firm databases. The method further includes receiving, by a computer, identification data from the client device, retrieving a law firm server endpoint address for one of the plurality of law firm servers based on the identification data, connecting to the law firm database within the law firm server that corresponds to the law firm server endpoint address such that the common web interface and the law firm database may communicate data, retrieving law firm data from the law firm database, and transmitting the retrieved law firm data to the client device.

In yet another embodiment, a system for transmitting law firm data retrieved from a law firm database to a client device using a common web interface includes a computing device that includes a non-transitory memory component that stores a set of executable instructions that causes the computing device to provide the common web interface to the client device, wherein the common web interface allows access to a plurality of law firm servers, each law firm server comprising a unique law firm server endpoint address and a plurality of law firm databases. The executable instructions further cause the computing device to receive identification data from the client device. The executable instructions further cause the computing device to retrieve a law firm server endpoint address for one of the plurality of law firm servers based on the identification data. The executable instructions further cause the computing device to connect to the law firm database within the law firm server that corresponds to the law firm server endpoint address such that the common web interface and the law firm database may communicate data. The executable instructions further cause the computing device to retrieve law firm data from the law firm database. The executable instructions further cause the computing device to transmit the retrieved law firm data to the client device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to methods and systems for accessing databases using a common web interface. More specifically, the embodiments described herein may provide a common web interface to client devices through which the client devices may access databases that the client devices are authorized to access. The common web interface may provide access to multiple databases to multiple client devices, where each user of a client device may only be authorized to access a subset of the databases accessible to the common web interface. The databases accessible to the common web interface are typically located remotely from the common web interface. Accordingly, embodiments described herein may avoid maintaining replicated databases co-located with the common web interface. Various embodiments of methods and systems for enabling a client device to receive data from an endpoint device using a common web interface are described in detail below.

Although embodiments described herein are described in the context of common websites that provide access to law firm databases contained within law firm servers, embodiments are not limited thereto. For example, the embodiments described herein may be utilized to provide access to databases other than law firm databases (e.g., corporate databases, government agency databases, educational databases, etc.).

Figure 1:
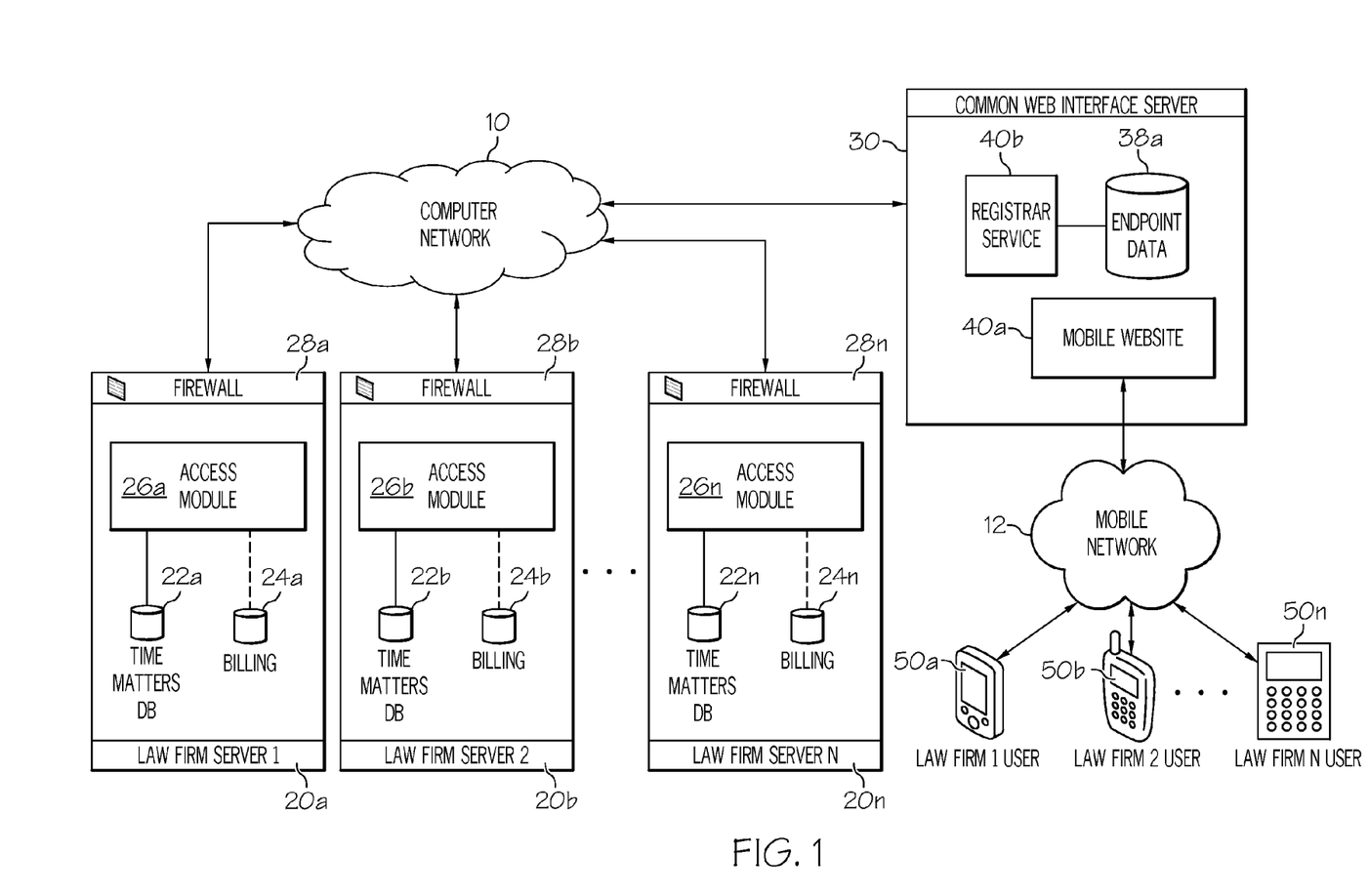
FIG. 1 depicts a schematic illustration of an exemplary database access architecture, illustrating components of a system for enabling a client device to receive data from an endpoint device using a common web interface, according to one or more embodiments described and illustrated herein.

Referring now to the drawings, FIG. 1 depicts an exemplary database access architecture, illustrating components of a system for enabling a client device to receive data from an endpoint device, here a law firm server, using a common web interface, according to embodiments shown and described herein. The database access architecture of the illustrated embodiment generally comprises a computer network 10, a mobile network 12, a plurality of law firm servers 20a, 20b, . . . , 20n, and a common web interface server 30. As described in detail below, the database access architecture may allow a user (e.g., lawfirm1 user of a first mobile device 50a, lawfirm2 user of a second mobile device 50b, . . . , lawfirmn user of an nth mobile device 50n) to access a database within the law firm server that the user is authorized to access via a common web interface located remotely from the law firm server containing the database.

As illustrated in FIG. 1, the computer network 10 may include a wide area network, such as the Internet, a local area network (LAN), a mobile communications network, a public service telephone network (PSTN) and/or other network and may be configured to electronically connect the law firm servers (generically referred to herein as the first law firm server 20a and the second law firm server 20b) to the common web interface server 30. In one embodiment, a Microsoft Windows Azure AppFabric Service Bus ("Azure Service Bus") may be overlaid on top of the computer network 10 such that the common web interface server 30 may communicate with the plurality of law firm servers 20a, 20b, . . . , 20n via the Azure Service Bus. Although embodiments are described herein as using the Azure Service Bus, embodiments are not limited thereto. Other products may be utilized to provide connectivity between the law firm servers and the common web interface server and to allow the common web interface server to communicate data with databases located within law firm servers that may include firewalls.

The mobile network 12 may include a mobile communications network, a public service telephone network (PSTN), a wide area network, such as the Internet, a local area network (LAN) and/or other network and may be configured to electronically connect a mobile device of a user to a law firm server the user is authorized to access (e.g. to electronically connect a first mobile device 50a of a user authorized to access the first law firm server 20a to the common web interface server 30 and to electronically connect a second mobile device 50b of a user authorized to access the second law firm server 20b to the common web interface server 30). It should be understood that the non-limiting architecture illustrated in FIG. 1 is provided for illustrative purposes only, and that other configurations are also possible. While the embodiments described herein may refer to specific users accessing specific law firm servers, any number of law firm servers may be provided to any number of users. Further, it should be understood that a plurality of users may be authorized to access a single law firm server.

Still referring to FIG. 1, the first law firm server 20a may include a time accounting database 22a, a billing database 24a, an access module 26a, and a firewall 28a. The access module 26a executes in a memory component of the first law firm server 20a. The access module 26a may receive requests from the common web interface server 30 to retrieve data from the time accounting database 22a or the billing database 24a. In response to requests to retrieve data, the access module 26a may retrieve the requested data and transmit it to the common web interface server 30. The access module 26a may authenticate users requesting data from the first law firm server 20a. In order to authenticate a user, access module 26a may receive a user ID and password associated with the user from a mobile device. The access module 26a may then verify that the received user ID and password combination permits the user to access the first law firm server 20a. The access module 26a may perform such authentication prior to a request to retrieve data from or concurrently with a request to retrieve data from a database within first law firm server 20a. While the first law firm server 20a is depicted as containing a time accounting database 22a and a billing database 24a, the first law firm server 20a may contain any type of database, including, but not limited to, databases containing contact data, scheduling data, case data, and/or matter data.

It should be understood that while the mobile devices are depicted as smartphones and common web interface server 30 and the law firm servers are depicted as servers, these are nonlimiting examples. More specifically, in some embodiments any type of computing device (e.g., mobile computing device (smart phone, tablet computer, laptop computer, etc.), personal computer, server, etc.) may be utilized for any of these components. Additionally, while each of these computing devices are illustrated in FIG. 1 as a single piece of hardware, this is also merely an example. More specifically, each of the mobile devices, the common web interface server 30, and the law firm servers may represent a plurality of computers, servers, databases, mass-storage devices, etc.

In the exemplary data access architecture depicted in FIG. 1, the mobile devices used to access the law firm servers may include a mobile web browser executing in a memory component. The mobile web browser of the mobile device may request that data be retrieved from or written to a database within the law firm server that the user of the mobile device is authorized to access, using the common web interface server 30 via the common web interface server 30. Using FIG. 1 as an example, the mobile web browser executing on the first mobile device 50a may request a time entry from a time accounting database 22a within the first law firm server 20a. As an example and not a limitation, the time accounting database may be a database in which attorneys and paralegals record their time for later billing of their clients (e.g. the LexisNexis Time Matters® product).

Still referring to FIG. 1, the common web interface server 30 includes a mobile website 40a executing in a memory component of the common web interface server 30. The mobile website 40a may receive a request from the mobile web browser of a mobile device (e.g., the first mobile device

50a or the second mobile device 50b) via mobile network 12 to retrieve data from a law firm database. In response to the mobile web browser's request to retrieve data from the law firm database, the mobile website 40a may send a request to retrieve the requested data to the law firm server that contains the database from which data was requested. In response to the mobile website 40a request to retrieve the requested data, the mobile website 40a may receive the requested data from the law firm server that contains the database from which the data was requested.

For example, with reference to FIG. 1, the mobile website 40a may receive a request to retrieve a time entry from a time accounting database 22a within the first law firm server 20a. In response to the mobile web browser request, the mobile website 40a may send a request to the first law firm server 20a to retrieve the time entry from the time accounting database 22a. In response to the request of mobile web site 40a, mobile website 40a may receive the requested time entry from the time accounting database 22a within the first law firm server 20a.

Still referring to FIG. 1, common web interface server 30 may include a registrar service 40b executing in a memory component of common web interface server 30 and an endpoint database 38a. Registrar service 40b may receive from law firm servers endpoint addresses associated with law firm servers and user IDs associated with each endpoint address. The user IDs may be e-mail addresses of users authorized to access the law firm server, for example. The endpoint addresses and associated user IDs may be stored in the endpoint database 38a. By storing all of the user IDs authorized to access each law firm server that registers with the registrar service 40b and accessing the endpoint database 38a to retrieve the endpoint address of the law firm server that a user wishes to access, the common web interface server 30 may enable multiple users to connect to multiple law firm servers.

Figure 2:
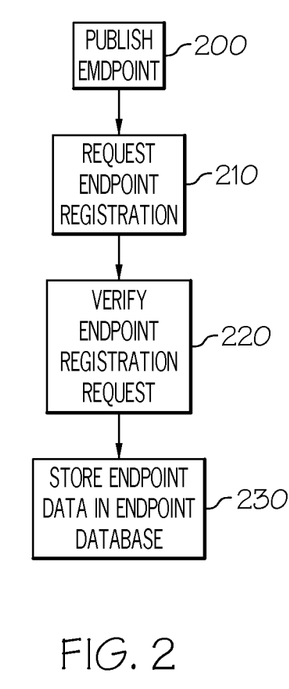
FIG. 2 depicts a flowchart of a method of registering an endpoint device with a common web interface server, according to one or more embodiments described and illustrated herein.

FIG. 2 is a flowchart that graphically illustrates a method of registering an endpoint device with a common web interface server. At block 200, the law firm server publishes the endpoint address of the law firm server. The endpoint address may be a unique endpoint address generated by the access module of the law firm server. In one embodiment, the endpoint address may be published to a Microsoft Windows Azure AppFabric Service Bus ("Azure Service Bus"). The Azure Service Bus may permit the common web interface server to connect with a database within a law firm server through a firewall within the law firm server.

Still referring to FIG. 2, at block 210, the access module of the law firm server may request to register the law firm server with the common web interface server. The registration request may include the endpoint address of the law firm server and all user IDs authorized to access the law firm server. The registration request may be sent by the access module of the law firm server to the registrar service of the common web interface server via the Azure Service Bus.

At block 220, the registrar service of the common web interface server may verify the registration request. In order to verify the registration request, the registrar server may send a message requesting confirmation of the registration request to the access module via the Azure Service Bus. In response, the access module may send a registration request confirmation message to the registrar service via the Azure Service Bus. In some embodiments, a method of registering a law firm server with a common web interface server may lack block 220, such as when the registrar service of the common web interface server does not verify the registration request.

In embodiments that verify the registration request, after receiving the registration request confirmation message, the registrar service may store the endpoint address of the law firm server and all user IDs authorized to access the law firm server in the endpoint database at block 230. In other embodiments that do not verify the registration request, the registrar server may store the endpoint address of the law firm server and all user IDs authorized to access the law firm server in the endpoint database at block 230.

Figure 3:
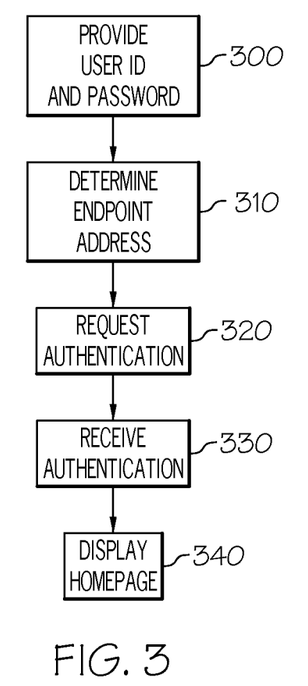
FIG. 3 depicts a flowchart of a method of authenticating a mobile device user as authorized to access an endpoint device utilizing a common web interface server, according to one or more embodiments described and illustrated herein.

FIG. 3 is a flowchart that graphically illustrates a method of authenticating a mobile device user as authorized to access an endpoint device utilizing a common web interface server. At block 310, a web browser executing on the user's mobile device may provide identification data and a password to the mobile website of the common web interface server. By way of example and not limitation, the identification data may comprise a user ID, an email address, a telephone number, or a login name. In the embodiment graphically illustrated in FIG. 3, the identifying data comprises a user ID. The user ID and password may be input by the user into the web browser. Alternatively, the web browser may automatically retrieve the user ID and password from a memory component of the user's mobile device. At block 310, the mobile website may determine the endpoint address associated with the user ID. The mobile website may determine the endpoint address by querying the registrar service for the endpoint address associated with the user ID. If the mobile website queries the registrar service, the registrar service may access the endpoint database to retrieve the endpoint address associated with the user ID and provide the retrieved endpoint address to the mobile website. Alternatively, the mobile website may directly access the endpoint database to retrieve the endpoint address associated with the user ID.

Still referring to FIG. 3, at block 320, the mobile website may request authentication of the user by sending an authentication request to the law firm server associated with the retrieved endpoint address via the Azure Service Bus. The authentication request may contain the user ID or other identifying data and the password of the user. The access module of the law firm server may receive the authentication request. The access module may then access a database that stores userID and password information to determine whether the combination of the user ID and password matches the user ID and password of a user authorized to access the law firm server. If the access module determines that the user is authorized to access the law firm server, the access module may send an authorization indicator message to the mobile website via the Azure Service Bus. At block 330, the mobile website may receive the authorization indicator message. In response to receiving the authorization indicator message, the mobile web site may display an authorized user home page to the web browser of the mobile device at block 340. The displayed authorized user home page allows the user to interact with the law firm server by entering data into and manipulating the authorized user home page.

Figure 4:
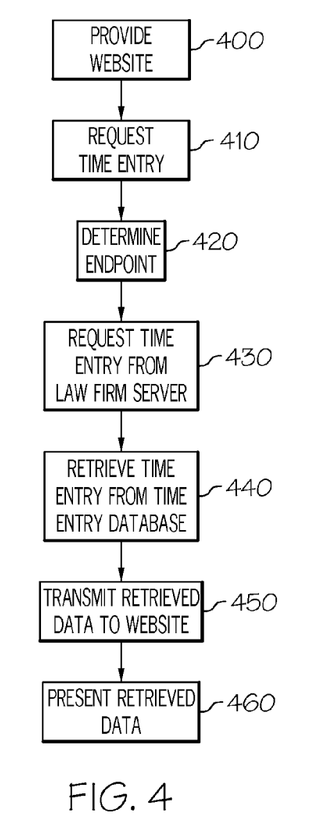
FIG. 4 depicts a flowchart of a method of receiving data from an endpoint device using a common web interface, according to one or more embodiments described and illustrated herein.

FIG. 4 is a flowchart that graphically illustrates a method of receiving data from an endpoint device using a common web interface. At block 400, a mobile web site is provided to a mobile device. The mobile website allows access to multiple law firm servers. Each law firm server comprises a unique law firm server endpoint address and a plurality of law firm databases. The mobile website may be accessed by a web browser of the mobile device. At block 410, the web browser of the mobile device may request particular information, such as a time entry. The time entry may be requested by transmitting a message to the mobile website of a common web interface server. The message may also include identification data related to the mobile device, including, but not limited to an email address, a login name, and a telephone number. The mobile website may receive the request to retrieve data from a law firm database along with the associated identification data. The message containing the request and the identification data may be received by the mobile website of the common web interface server. At block 420, the mobile website may determine the law firm server endpoint address by querying the registrar service for the law firm server endpoint address associated with the identification data. If the mobile website queries the registrar service, the registrar service may access the endpoint database to retrieve the law firm server endpoint address associated with the identification data and provide the retrieved law firm server endpoint address to the mobile website. Alternatively, the mobile website may directly access the endpoint database to retrieve the law firm server endpoint address associated with the identification data.

In response to receiving the endpoint address associated with the identification data, at block 430, the mobile website may connect to the law firm server associated with the retrieved law firm server endpoint address so that the mobile website and the law firm server can communicate data by any means. Once the mobile web site and the law firm server are connected, the mobile website may request the time entry (or other information) requested by the web browser. More particularly, the mobile website may connect to the access module of the law firm server associated with the retrieved law firm server endpoint address and request the time entry requested by the web browser via the Azure Service Bus. At block 440, the access module of the law firm server may retrieve the time entry from a time entry database. At block 450, the access module of the law firm server may send the retrieved time entry to the mobile website via the Azure Service Bus. After receiving the retrieved time entry, the mobile website may present the retrieved time entry to the web browser of the requesting mobile device at block 460. In addition to retrieving individual time entries, mobile device users may also add time entries or view multiple time entries (e.g, all time entries from a particular day or all time entries associated with a particular client, etc.), or provide or view additional information or data depending on the content of the database.

Figure 5:
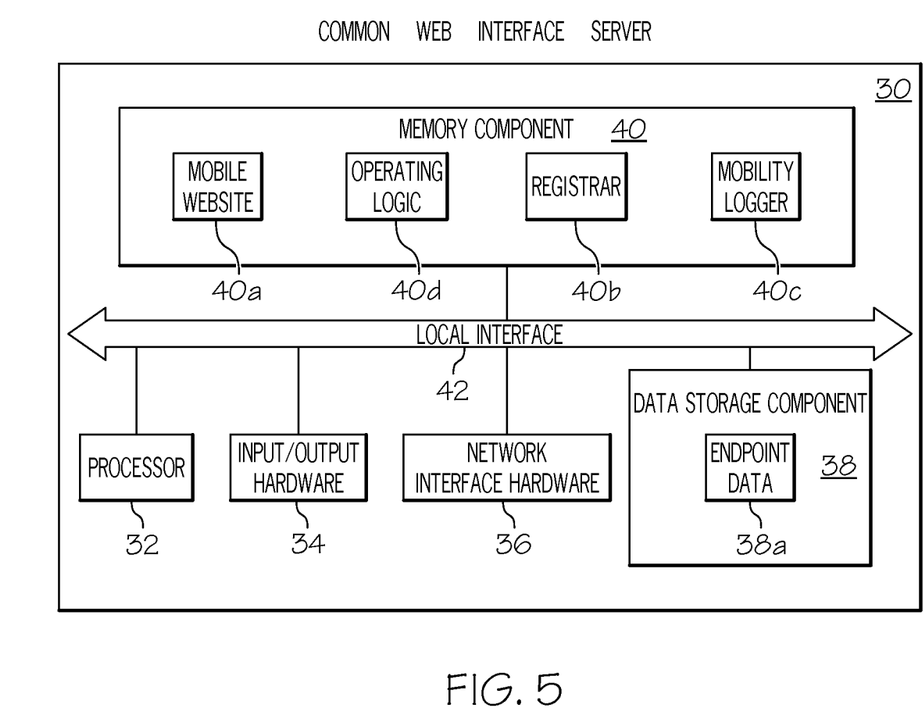
FIG. 5 depicts a schematic illustration of the common web interface server from FIG. 1, further illustrating hardware and software that may be utilized in performing the search query generation functionality, according to one or more embodiments described and illustrated herein.

FIG. 5 depicts an exemplary embodiment of the common web interface server 30 depicted in FIG. 1, further illustrating components of a system for enabling a client device to receive data from an endpoint device using a common web interface, according to embodiments shown and described herein. While in some embodiments, the common web interface server 30 may be configured as a general purpose computer with the requisite hardware, software, and/or firmware, in some embodiments, that common web interface server 30 may be configured as a special purpose computer designed specifically for performing the functionality described herein.

The common web interface server 30 may include a processor 32, input/output hardware 34, network interface hardware 36, a data storage component 38 (which may store endpoint data in an endpoint database 38*a*, and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store mobile website 40*a*, registrar service 40*b*, mobility logger 40*c*, and operating logic 40*d* (each of which may be embodied as computer readable program code, firmware, or hardware, as an example). A local interface 42 is also included in FIG. 5 and may be implemented as a bus or other interface to facilitate communication among the components of the common web interface server 30.

The processor 32 may include any processing component configured to receive and execute computer readable code instructions (such as from the data storage component 38 and/or memory component 40). The input/output hardware 34 may include a graphics display device, keyboard, mouse, printer, camera, microphone, speaker, touch-screen, and/or other device for receiving, sending, and/or presenting data. The network interface hardware 36 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 38 may reside local to and/or remote from the common web interface server 30, and may be configured to store one or more pieces of data for access by the common web interface server 30 and/or other components. As illustrated in FIG. 5, the data storage component 38 may store endpoint data in an endpoint database 38*a*, which in at least one embodiment includes endpoint addresses of law firm servers and user IDs associated with the endpoint addresses. The endpoint data may be stored in one or more data storage devices.

Included in the memory component 40 may be the mobile website 40*a*, the registrar service 40*b*, the mobility logger 40*c*, and the operating logic 40*d*. The operating logic 40*d* may include an operating system and/or other software for managing components of the common web interface server 30.

It should now be understood that the components illustrated in FIG. 5 are merely exemplary and are not intended to limit the scope of this disclosure. More specifically, while the components in FIG. 5 are illustrated as residing within the common web interface server 30, this is a nonlimiting example. In some embodiments, one or more of the components may reside external to the common web interface server 30.

It should be understood that embodiments described herein provide a common web interface for providing access to databases located within separate computer networks so that multiple mobile computing device users may access the databases located in the network that the mobile computing device is authorized to access. Further, embodiments described herein may avoid replication of databases that may contain sensitive data. Moreover, by avoiding replication of databases, embodiments described herein may avoid the need to synchronize replicated databases to ensure that the databases contain current data.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method for transmitting data retrieved from an endpoint device to a client device using a common web interface comprising:

providing, automatically by one or more computers, the common web interface to the client device, wherein the common web interface allows access to a plurality of endpoint devices, each endpoint device comprising a unique endpoint address and a plurality of databases;

receiving, automatically by the one or more computers, a registration request from one of the plurality of endpoint devices, wherein the registration request comprises an endpoint address of the endpoint device and a plurality of user IDs authorized to access the endpoint device;

verifying, automatically by the one or more computers, the registration request by sending a message requesting confirmation of the registration request to the endpoint device and receiving a registration request confirmation message from the endpoint device;

in response to verifying the registration request, storing, automatically by the one or more computers, the endpoint address and the plurality of user IDs authorized to access the endpoint address in an endpoint database;

receiving, automatically by the one or more computers, a user ID from the client device;

retrieving, automatically by the one or more computers, the endpoint address for one of the plurality of endpoint devices from the endpoint database based on the received user ID;

connecting, automatically by the one or more computers, to one of the plurality of databases of the endpoint device corresponding to the endpoint address such that the common web interface and the database may communicate data;

retrieving, automatically by the one or more computers, data from the database; and transmitting, automatically by the one or more computers, the retrieved data to the client device.

2. The method of claim 1 further comprising:
receiving a password from the client device associated with the received user ID;
providing the received user ID and the received password to the endpoint device for authentication; and
receiving an authentication indicator from the endpoint device.

3. The method of claim 1, wherein the endpoint device comprises a firewall.

4. The method of claim 1, wherein the endpoint device comprises a database.

5. The method of claim 1, wherein the user ID data comprises at least one of an email address, a telephone number, or a login name.

6. The method of claim 1, wherein the endpoint device comprises a law firm server.

7. The method of claim 1, wherein the data comprises law firm data.

8. The method of claim 7, wherein the law firm data comprises at least one of time entry data, contact data, scheduling data, case data, matter data, or billing data.

9. A computer-implemented method for transmitting law firm data retrieved from a law firm database to a client device using a common web interface comprising:
providing, automatically by one or more computers, the common web interface to the client device, wherein the common web interface allows access to a plurality of law firm servers, each law firm server comprising a unique law firm server endpoint address and a plurality of law firm databases;

receiving, automatically by the one or more computers, a registration request from one of the plurality of law firm servers, wherein the registration request comprises a law firm server endpoint address of the law firm server and a plurality of user IDs authorized to access the law firm server;

verifying, automatically by the one or more computers, the registration request by sending a message requesting confirmation of the registration request to the law firm server and receiving a registration request confirmation message from the law firm server;

in response to verifying the registration request, storing, automatically by the one or more computers, the law firm server endpoint address and the plurality of user IDs authorized to access the law firm server in an endpoint database;

receiving, automatically by the one or more computers, a user ID from the client device;

retrieving, automatically by the one or more computers, the law firm server endpoint address for one of the plurality of law firm servers from the endpoint database based on the received user ID;

connecting, automatically by the one or more computers, to the law firm database within the law firm server that corresponds to the law firm server endpoint address such that the common web interface and the law firm database may communicate data;

retrieving, automatically by the one or more computers, law firm data from the law firm database, wherein the law firm data comprises at least one of time entry data, contact data, scheduling data, case data, matter data, or billing data; and transmitting, automatically by the one or more computers, the retrieved law firm data to the client device.

10. The method of claim 9 further comprising:
receiving a password from the client device associated with the received user ID;
providing the received user ID and the received password to the law firm server for authentication; and
receiving an authentication indicator from the law firm server.

11. The method of claim 9, wherein the user ID comprises at least one of an email address, a telephone number, or a login name.

12. A system for transmitting law firm data retrieved from a law firm database to a client device using a common web interface comprising:
a computing device that comprises a non-transitory memory component that stores a set of executable instructions that causes the computing device to:
provide the common web interface to the client device, wherein the common web interface allows access to a plurality of law firm servers, each law firm server comprising a unique law firm server endpoint address and a plurality of law firm databases;
receive a registration request from one of the plurality of law firm servers, wherein the registration request comprises a law firm server endpoint address of the law firm server and a plurality of user IDs authorized to access the law firm server;
verify the registration request by sending a message requesting confirmation of the registration request to the law firm server and receiving a registration request confirmation message from the law firm server;
in response to verifying the registration request, store the law firm server endpoint address and the plurality of user IDs authorized to access the law firm server in an endpoint database;
receive a user ID from the client device;
retrieve the law firm server endpoint address for one of the plurality of law firm servers from the endpoint database based on the received user ID;

connect to the law firm database within the law firm server that corresponds to the law firm server endpoint address such that the common web interface and the law firm database may communicate data;

retrieve law firm data from the law firm database; and transmit the retrieved law firm data to the client device.

13. The system of claim 12, wherein the set of executable instructions further causes the computing device to:

receive a password from the client device associated with the received user ID;

provide the received user ID and the received password to the law firm server for authentication; and receive an authentication indicator from the law firm server.

14. The system of claim 12, wherein the law firm data comprises at least one of time entry data, contact data, scheduling data, case data, matter data, or billing data.

* * * * *